United States Patent Office 3,026,245
Patented Mar. 20, 1962

3,026,245
METHOD OF CONTROLLING NEMATODES EMPLOYING THIOTHIAZOLINES
Donald S. Cannon, Wilton, Conn., assignor to American Cyanamid Company, New York, N.Y., a corporation of Maine
No Drawing. Filed June 18, 1959, Ser. No. 821,117
7 Claims. (Cl. 167—33)

This invention relates to the control of nematodes and other parasitic worm life which exist in the soil at some stage of their life cycles, for example, eggs, larvae and adult worms. More particularly, it is concerned with a class of thiazoline compounds which are highly effective in controlling nematodes, and with nematocidal compositions containing the same.

These nematocidal compounds are the thiothiazolines which may be represented by the general formula:

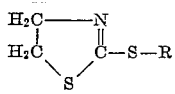

wherein R stands for aliphatic hydrocarbon radicals containing from one to twelve carbon atoms such as methyl, ethyl, propyl, isopropyl, allyl, 2-methylallyl, butyl, hexyl, 2-ethylhexyl, octyl, decyl and dodecyl.

The above compounds may be readily prepared by reacting 2-mercaptothiazoline with an organic halide in the presence of alkali according to methods disclosed in United States Patent No. 2,516,313.

The thiazoline compounds may be applied alone to the soil, or they may be formulated on granules for application with a conventional fertilizer spreader, as emulsifiable concentrate or wettable powder for application with sprayers, as a dust for application with a conventional duster, or adsorbed on activated carbon for application to seeds.

It is an advantage of the present invention that the nematocidal compounds characterized above are effective when employed in dilute concentrations. It is preferred, therefore, to incorporate the compounds in a variety of suitable solid or liquid carriers or diluents. Such compositions can be prepared either as a suspension in a suitable non-solvent or as a dust. A suspension or dispersion of the nematocidal compound in a non-solvent such as water may be prepared for direct application to infested soils. Alternatively, a prepared suspension of the compound may be modified by the addition thereto of small amounts, usually from about 1 to about 5 parts, of a commercially available dispersing or surface active agent per 100 parts of the nematocidal compound. Examples of surface active compounds are: the sodium salt of polymerized propyl naphthalene sulfonic acid (Daxad 11), an alkyl aryl polyether alcohol (Triton X–100) and a modified phthalic gylcerol alkyd resin (Triton B–1956).

In the preparation of dusts, the nematocidal compound may be admixed with a finely-divided inert granular material as a carrier in any conventional manner. Useful carriers include talc, kaolin, silica, chalk, wood flour, fuller's earth, charcoal, activated carbon and the like.

The following examples further illustrate the invention but are not to be construed as limiting the same.

EXAMPLE 1

Four milliliter aliquots of the thiazoline compounds in water at concentrations of 0.1, 0.01 and 0.001 percent were placed in vials. To each vial was added 100 Anguillula nematodes. The vials were rotated for 20 hours, and thereafter mortality counts were recorded as shown in the following table.

Table 1

| Compound | Percent kill of nematodes | | |
|---|---|---|---|
| | 0.1 | 0.01 | 0.001 |
| 2-(methylthio)-2-thiazoline | 100 | 0 | 0 |
| 2-(allylthio)-2-thiazoline | 100 | 50 | 0 |
| 2-(dodecylthio)-2-thiazoline | 100 | 100 | 100 |

EXAMPLE 2

Sandy loam soil infested with root-knot nematode eggs, larvae and adults, was placed in one quart glazed crocks. The 2-(allylthio)-2-thiazoline compound was prepared as a 20% concentrate in carbon tetrachloride, and injected by means of a burette into the center portion of the soil of four crocks each at rates equilvalent to 50, 25 and 10 pounds per acre. Immediately following treatment, a seedling tomato plant was planted directly over the center of two crocks. Eight days later a seedling tomato plant was planted in the remaining two crocks. Each treatment was duplicated. Thirty-two days after treatment, the plants were removed and the degree of galling was determined. The results shown in the following table are expressed as percent of roots galled averaged for the two treatments.

Table 2

| Compound | Pounds per acre | Percent of roots galled | |
|---|---|---|---|
| | | When planted immediately | When planted 8 days later |
| Untreated | | 37.5 | 87.5 |
| 2-(allylthio)-2-thiazoline | 50 | 0 | 0 |
| Do | 25 | 50 | 0 |
| Do | 10 | 50 | 25 |

EXAMPLE 3

Soil infested with root-knot nematodes was placed in crocks as described in Example 2. Three methods of application of the 2-(allylthio)-2-thiazoline compound were compared: (1) fumigant injection (a 20% concentrate in carbon tetrachloride); (2) liquid drench (a 50% emulsifiable concentrate diluted in water and applied at the rate equivalent to one gallon of water per square yard); (3) as a granular soil mix (impregnated on 30/60 mesh Attaclay granules to constitute a 2% granular). All rates were calculated as equivalent to four and one gallon of material per acre. Seedling tomato plants were planted in the center of each crock immediately after treatment, and each treatment was duplicated. Twenty-eight days after treatment, the plants were removed and the degree of galling was observed. The results shown in the following table are expressed as the average of the percent of roots galled of both duplicates.

Table 3

| Compound | Gallons per acre | Percent of roots galled | | |
|---|---|---|---|---|
| | | Fumigant | Drench | Granular |
| 2-(allylthio)-2-thiazoline | 4 | 0 | 0 | 0 |
| Do | 1 | 2.5 | 15.0 | 0 |

The nematocidal compounds with which the present invention is concerned must be used in effective amounts. As noted above, they may be effectively applied to soils in various ways such as a dust for application with a conventional duster, as an emulsion for application with sprayers, or granules for application with a conventional fertilizer spreader, or adsorbed on activated carbon for application to seeds. Whatever the method of application, a good practice is to apply the thiazoline compounds at concentrations varying from 10 to 50 pounds per acre.

I claim:
1. A method of controlling nematodes in the soil which comprises applying thereto a thiazoline compound of the general formula:

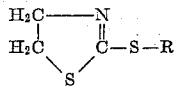

wherein R represents a member of the group consisting of allyl, and alkyl radicals containing from one to twelve carbon atoms.

2. A method as defined in claim 1 in which said compoound is 2-(methylthio)-2-thiazoline.
3. A method as defined in claim 1 in which said compound is 2-(allylthio)-2-thiazoline.
4. A method as defined in claim 1 in which said compound is 2-(dodecylthio)-2-thiazoline.
5. A method of controlling nematodes in the soil which comprises mixing a thiazoline compound of the formula:

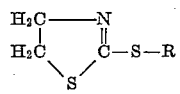

wherein R represents a member of the group consisting of allyl, and alkyl radicals containing from one to twelve carbon atoms with a finely-divided inert granular material, and mixing the resulting mixture with the soil.

6. A method according to claim 5 characterized in that the mixture of the thiazoline compound and a finely-divided inert granular material is applied as a dust on seed planted in the soil.

7. A method of controlling nematodes in the soil which comprises applying an aqueous emulsion of a thiazoline compound of the formula:

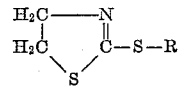

wherein R represents a member of the group consisting of allyl, and alkyl radicals containing from one to twelve carbon atoms.

References Cited in the file of this patent
UNITED STATES PATENTS

| | | |
|---|---|---|
| 1,982,902 | Flint | Dec. 4, 1934 |
| 2,057,044 | Meisenburg | Oct. 13, 1936 |
| 2,377,446 | Payne | June 5, 1945 |
| 2,419,073 | Hammer | Apr. 15, 1947 |
| 2,435,204 | Davidson | Feb. 3, 1948 |
| 2,473,984 | Bickerton | June 21, 1949 |
| 2,502,244 | Carter | Mar. 28, 1950 |
| 2,543,580 | Kay | Feb. 27, 1951 |
| 2,726,485 | Thomas | Dec. 13, 1955 |
| 2,730,547 | Dye | Jan. 10, 1956 |
| 2,743,209 | Jones | Apr. 24, 1956 |
| 2,770,638 | Giolito | Nov. 13, 1956 |
| 2,779,680 | Wolf | Jan. 29, 1957 |
| 2,794,727 | Barrows | June 4, 1957 |
| 2,802,021 | Heininger | Aug. 6, 1957 |
| 2,802,818 | Wheeler | Aug. 13, 1957 |